United States Patent [19]

Meirowitz et al.

[11] Patent Number: 5,130,073
[45] Date of Patent: Jul. 14, 1992

[54] METHOD OF PROVIDING A POLYESTER ARTICLE WITH A HYDROPHILIC SURFACE

[75] Inventors: Randy E. Meirowitz, Neenah; Robert J. Phelan, Appleton, both of Wis.

[73] Assignee: Kimberly-Clark Corporation, Neenah, Wis.

[21] Appl. No.: 464,800

[22] Filed: Jan. 16, 1990

[51] Int. Cl.$^5$ .................. D01F 11/04; C09D 201/02
[52] U.S. Cl. .................. 264/129; 264/211.13; 264/211.14; 264/232; 264/234; 264/340; 264/345; 427/375; 427/393.5; 427/394
[58] Field of Search .......... 427/434.6, 375, 393.5, 427/394; 264/129, 83, 211.16, 211.19, 176.1, 210.3, 210.4, 211.13, 211.14, 232, 234, 340, 345

[56] References Cited

U.S. PATENT DOCUMENTS

| | | | |
|---|---|---|---|
| 3,335,209 | 8/1967 | Morgan, Jr. et al. | 264/136 |
| 3,366,721 | 1/1968 | Burdge et al. | 264/129 |
| 3,416,952 | 12/1968 | McIntyre et al. | 117/118 |
| 3,946,100 | 3/1976 | Davis et al. | 264/211.15 |
| 3,954,928 | 5/1976 | Omori et al. | 264/51 |
| 3,959,421 | 5/1976 | Weber et al. | 264/6 |
| 4,045,510 | 8/1977 | Login | 260/830 P |
| 4,277,430 | 7/1981 | Peckinpaugh et al. | 264/129 |
| 4,288,207 | 9/1981 | Wilkes | 425/72 S |
| 4,376,013 | 3/1983 | Wang | 162/274 |
| 4,404,314 | 9/1983 | Jabloner | 524/519 |
| 4,578,414 | 3/1986 | Sawyer et al. | 524/310 |
| 4,734,445 | 3/1988 | Noda et al. | 523/201 |
| 4,735,843 | 4/1988 | Noda | 428/137 |
| 4,785,030 | 11/1988 | Noda et al. | 523/201 |
| 4,804,378 | 2/1989 | Shiba et al. | 604/367 |

FOREIGN PATENT DOCUMENTS

| | | |
|---|---|---|
| 0128677 | 12/1984 | European Pat. Off. . |
| 0209775 | 1/1987 | European Pat. Off. . |
| 0221046 | 5/1987 | European Pat. Off. . |
| 0245074 | 11/1987 | European Pat. Off. . |
| 0255701 | 2/1988 | European Pat. Off. . |
| 50-052180 | 5/1975 | Japan . |
| 75039756 | 12/1975 | Japan . |
| 78007999 | 3/1978 | Japan . |
| 57-205585 | 12/1982 | Japan . |
| 57-207640 | 12/1982 | Japan . |
| 58-018480 | 2/1983 | Japan . |
| 58-018481 | 2/1983 | Japan . |
| 59-112069 | 6/1984 | Japan . |
| 62-289674 | 12/1987 | Japan . |
| 63-132625 | 6/1988 | Japan . |
| 1072484 | 6/1967 | United Kingdom . |
| 1143385 | 2/1969 | United Kingdom . |
| 1143944 | 2/1969 | United Kingdom . |
| 1155267 | 6/1969 | United Kingdom . |
| 1175207 | 12/1969 | United Kingdom . |

OTHER PUBLICATIONS

"The Three Dimensional Solubility Parameter—Key to Paint Component Affinities; I. Solvents, Plasticizers, Polymers, and Resins" C. M. Hansen, *Journal of Paint Technology*, Feb., 1967, Vol. 39, No. 505.

"The Three Dimensional Solubility Parameter-Key to Paint Component Affinities; II. and III." C. M. Hansen, *Journal of Paint Technology*, Aug., 1967, Vol. 39, No. 511.

"The Universality of the Solubility Parameter" C. M. Hansen, *I & EC Product Research and Development*, Mar., 1969, Vol. 8, No. 1.

"Intgeractions of Nonaqeuous Solvents with Textile Fibers" B. H. Knox, et al., *Textile Research Journal*, Mar., 1975, pp. 203-217.

"Bimodal Character of Polyester-Solvent Interactions." B. H. Knox, *Journal of Applied Polymer Science*, vol. 21, pp. 225-276 (1977).

*Primary Examiner*—Hubert C. Lorin
*Attorney, Agent, or Firm*—Thomas J. Mielke

[57] ABSTRACT

A generally hydrophobic polyester article is provided with a generally hydrophilic surface by contacting said general hydrophobic polyester with a copolymeric material while said polyester is at a temperature above its melting point. The copolymeric composition comprises a generally hydrophobic moiety and a generally hydrophilic moiety. Also disclosed is a method for imparting the hydrophilic surface to a generally hydrophobic polyester which method comprises contacting a generally hydrophobic polyester with a copolymeric material while said generally hydrophobic polyester is at a temperature above its melting point. In one preferred embodiment the generally hydrophobic polyester is contacted with said copolymeric composition immediately after said polyester has been extruded and while said polyester is undergoing die swell.

9 Claims, No Drawings

METHOD OF PROVIDING A POLYESTER ARTICLE WITH A HYDROPHILIC SURFACE

BACKGROUND OF THE INVENTION

1. Field of the Invention

The present invention relates to improved polyester articles. Specifically, the present invention relates to a polyester article exhibiting a generally hydrophilic surface.

2. Description of the Related Art

The use of various polyester compositions for forming a variety of shaped articles is known. For example, polyesters are known to be useful in forming fibers which can be formed into a variety of woven and nonwoven materials. Such polyester materials generally possess a relatively hydrophobic surface. When it is desired to employ a woven or nonwoven material in an absorbent product such as a diaper, bandage, adult incontinent product, feminine napkin, or the like, it is often desirable that such material exhibit a generally hydrophilic (wettable) surface in order to allow water to pass therethrough.

In the past, when it has been desired to employ a woven or nonwoven polyester material in a personal care product, for other than the backing material, it has been suggested to render the polyester material wettable (hydrophilic) by applying a surface treatment such as a surfactant to the polyester. Unfortunately, such surface treatments are generally fugitive in nature. That is, while appearing wettable for an initial application of liquid, after a given amount of water has passed through the polyester material, the surface treatment tends to wash off of the polyester material. Obviously, after the surface treatment has been washed off the polyester material, the polyester material is no longer capable of exhibiting a wettable (hydrophilic) surface and instead exhibits its natural hydrophobic surface.

When polyester materials are employed in personal care products, such as diapers, it is likely that they will be required to pass relatively large quantities of liquid waste and will be subjected to multiple insults of liquid waste. When polyester fabrics having a surfactant type surface treatment are employed in a diaper, they are generally capable of passing at least the first urine insult but become less capable of passing urine with each subsequent insult. Since a diaper may generally be subjected to three or more urine insults, surfactant treated polyester materials have proven generally unsatisfactory for use in diapers, for example, as a body-side liner.

Accordingly, attempts have been made to develop a surface treatment for polyester materials which surface treatment is generally not fugitive thereby rendering said polyester fiber wettable on a more permanent basis. For example, U.S. Pat. No. 3,416,952 issued Dec. 17, 1968 to McIntyre et al., is directed to a surface modifying treatment for shaped articles made from polyesters. Described is a process for treating shaped articles made from an essentially linear crystalizable polyester. The polyester article is treated with a polymeric compound which contains, within a single molecule, repeat units identical with those forming the crystalizable portions of the polyester article and at least one active group serving to modify the surface of the shaped article. Described as being suitable for use as an active group are water solvatable polymeric groups. According to the process, the polymeric compound is applied to the surface of the shaped article and the shaped article subjected to a thermal treatment at a temperature above 90° C. In order to prevent damaging the shaped article the thermal treatment generally occurs at a temperature below the melting point of the shaped article. The shaped article so produced is described as appearing generally hydrophilic in nature.

Similarly, U.S. Pat. No. 4,376,013 issued Mar. 8, 1983 to Wang is directed to a process for removal of pitch-containing water and method of coating belts for paper machines. Disclosed is a method of treating papermakers' forming and press belts made from polyethylene terephthalate mono or multi filament yarns. The belts are coated with a coating compound which is co-crystalline with the polyethylene terephthalate at the surface of the filament. The coating contains a profusion of oxyalkylene groups to establish a hydrophilic barrier of active oxyalkylene groups by solvation with water to repel the pitch from the belt. Disclosed as a suitable coating is a block or graft copolymer in which the first polymeric constituent is a crystalline polyester and the second polymeric constituent is solvatable by water. After the coating is applied to the polyester belt, the belt is raised to a temperature within the range of from about 250° F. to about 420° F. (about 121° C. to about 216° C.). The heat treatment is described as causing co-crystallization of the coating compound which has polyester repeat units identical with those of the repeat unit constituting the crystallized segment of the internal structure of the filament.

Both of the above references describe applying a surface coating to polyesters and heating the coated polyesters to temperatures less than the melting point of the polyesters. Polyester articles produced as described in the above two patents may have surface treatments which are generally less fugitive than surfactant treated polyesters. Nonetheless, it has been found that such surface treatments do, under certain circumstances, tend to be fugitive and wash off of the polyester articles. This is particularly true when the active groups responsible for imparting the hydrophilic nature to the polyester articles possess a high degree of hydrophilicity. In such cases, due to the high degree of hydrophilicity displayed by the active groups, the attraction of the hydrophilic groups for water is sufficient to cause the nonhydrophilic portion (e.g., polyester portion) to be pulled from the polyester article.

Additionally, certain polyesters and polyester formed into certain shapes have limited dimensional stability. For example, many polyesters, when formed into meltblown webs, will be dimensionally stable only up to a temperature of about 80° C. Thus, to employ the heat treatment processes described in the referenced two patents at temperatures significantly above about 80° C. will cause the meltblown webs to contract into "nuggets" of polyester if the meltblown webs are unrestrained.

Finally, the process described in the above cited two patents requires separate heating chambers and processing conditions sufficient to allow the articles to be maintained at an elevated temperature for a given period of time. This is costly in terms of equipment, energy and efficiency.

SUMMARY OF THE PRESENT INVENTION

It is desirable to produce a polyester article which possesses a generally hydrophilic surface which is less fugitive than known polyester articles exhibiting a generally hydrophilic surface. Additionally, it is desirable to provide a method for imparting a generally hydrophilic surface to polyester articles which hydrophilic surface is generally non-fugitive.

These and other related goals are achieved by melt fusing a moiety of a copolymeric material to a generally hydrophobic base polyester. The copolymeric material comprises a generally hydrophobic moiety and a generally hydrophilic moiety. The generally hydrophobic moiety is soluble in the polyester. The generally hydrophilic moiety is generally insoluble in the polyester.

Melt fusing the copolymeric material to the polyester has been found to impart, to the polyester, a generally hydrophilic surface which is less fugitive when compared to a similar polyester wherein the copolymeric material is not melt fused to the polyester.

In another aspect, the present invention concerns a method for providing a generally hydrophobic polyester with a generally hydrophilic surface. The method comprises contacting the generally hydrophobic polyester with a copolymeric material while said generally hydrophobic polyester is above its melting point. The copolymeric material comprises a generally hydrophobic moiety and a generally hydrophilic moiety. The generally hydrophobic moiety is soluble in the polyester and the generally hydrophilic moiety is generally insoluble in the polyester.

In a particularly preferred embodiment of the present invention a polyester fiber having a generally hydrophilic surface is prepared by extruding a generally hydrophobic polyester in the shape of a fiber. As the generally hydrophobic polyester exits the die the polyester is immediately contacted with the above described copolymeric material. At the point of contact, the extruded hydrophobic polyester is molten and is undergoing a degree of die swell. Contacting the polyester with the copolymeric material at this stage has proven particularly useful in producing a fiber which has a generally non-fugitive, hydrophilic surface.

DETAILED DESCRIPTION OF THE PREFERRED EMBODIMENT

The present invention concerns an article formed from a generally hydrophobic polyester which article has a generally hydrophilic surface. The generally hydrophilic surface is improved with respect to its ability to remain attached to the polyester substrate when compared to known hydrophobic polyesters having generally hydrophilic surfaces. The invention further comprises a method by which such an article may be formed.

Polyesters are known to those skilled in the art. Any polyester capable of being fabricated into an article is believed suitable for use in the present invention. As a general rule polyesters contain certain crystalline areas as well as certain amorphous areas. Generally, it is preferred that the polyester material employed in the present invention comprise at least about 50% by weight of a linear crystalline polyester and preferably at least about 80% by weight of a linear crystalline polyester. Exemplary of the polyester material suitable for use in the present invention are the polyesters and copolyesters derived from poly (ethylene terephthalate), poly (tetramethylene terephthalate), poly (1,4-bismethylenecyclohexane terephthalate), poly (ethylene naphthalene-2,6-dicarboxylate), poly (ethylene diphenoxyethane-4,4'-dicarboxylate), and the like.

Those skilled in the art will recognize that polyesters such as those described above are generally hydrophobic in nature. As used herein, the term "hydrophobic" refers to materials having a contact angle of water in air of at least 90°. For the purposes of this application, contact angle measurements are determined as set forth by Good and Stromberg in "Surface and Colloid Science" Vol. II (Plenum Press, 1979).

According to the present invention, polyester articles formed from hydrophobic polyester are treated with a copolymeric material to produce a generally hydrophilic surface on such articles. As used herein, the term "hydrophilic" refers to an article having a contact angle of water in air of less than 90° determined as set forth above in connection with the definition of "hydrophobic". Further, as used herein, the term "copolymeric" is intended to refer to a polymeric material formed from two or more monomers.

The copolymeric material of the present invention may be a linear polymer or a branched-chain polymer. Moveover, the copolymer may be a random copolymer, a block copolymer, a graft copolymer, or the like. The copolymeric material contains at least two distinct moieties. One of the moieties is generally hydrophobic with the second moiety being generally hydrophilic. A particular moiety will be considered to be generally hydrophilic or hydrophobic when a homopolymer formed from repeating units of said moiety produces a polymeric composition which exhibits, respectively, hydrophilic or hydrophobic characteristics a defined herein.

The generally hydrophobic moieties of the copolymeric material are soluble in the polyester from which the polyester article is formed. As used herein, a particular hydrophobic moiety will be considered to be soluble in said polyester when a homopolymer formed from repeating units of said moiety is within at least one, preferably within at least two of the spheres of interaction for said polyester. For the purposes of this application, the spheres of interaction of a polyester are determined by Hansen solubility parameters as set forth (for polyethylene terephthalate) by B. H, Knox in "Bimodal Character of Polyester-Solvent Interactions. I. Evaluation of the Solubility Parameters of the Aromatic and the Aliphatic Ester Residues of Poly(ethylene Terephthalate)" *Journal of Applied Polymer Science*, Vol. 21, pp. 225-247 (1977); "Bimodal Character of Polyester-Solvent Interactions II. Evaluation of the Chemical Structures of the Aromatic and Aliphatic Ester Residues of Poly(ethylene Terephthalate)" *Journal of Applied Polymer Science*, Vol. 21 pp. 249-266 (1977); and "Bimodal Character of Polyester-Solvent Interactions. III. The Effects of Morphology on the Nature of the Interaction of Nonaqueous Solvents with the Aromatic and the Aliphatic Ester Residues of Poly(ethylene Terephthalate)" *Journal of Applied Polymer Science*, Vol. 21, pp. 267-276 (1977); which articles and references cited therein are hereby incorporated by reference in their entirety.

For example, when the polyester is (poly)ethylene terephthalate, a generally hydrophobic moiety which is soluble in the polyester should have solubility parameters (dispersion, polar and H-bonding) falling completely within one and preferably within both of the ranges set forth below. Range 1 corresponds to the solubility parameters of the aromatic residue of the polyester and Range 2 corresponds to the solubility parameters of the aliphatic ester residue of the polyester. The solubility parameters define the spheres of interaction.

|  |  | dispersion | polar | H-bonding |
|---|---|---|---|---|
| Range 1[1] | (max.) | 10.92 | 4.38 | 4.88 |
|  | (min.) | 7.18 | 0.63 | 1.13 |
| Range 2[2] | (max.) | 11.78 | 8.91 | 5.06 |
|  | (min.) | 7.45 | 4.49 | 0.64 |

[1] Aromatic residue.
[2] Aliphatic residue.

As a general rule, solubility of the generally hydrophobic moiety can be ensured by having said moiety comprise one of the repeating units present in the polyester from which the polyester article is formed. For example, if the article to be treated is formed from a polyethylene terephthalate polyester represented by the following formula:

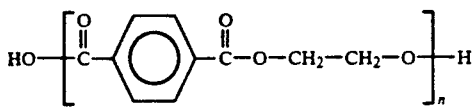

Solubility of the generally hydrophobic moiety can be ensured by having said moiety comprise repeating units represented by the formula:

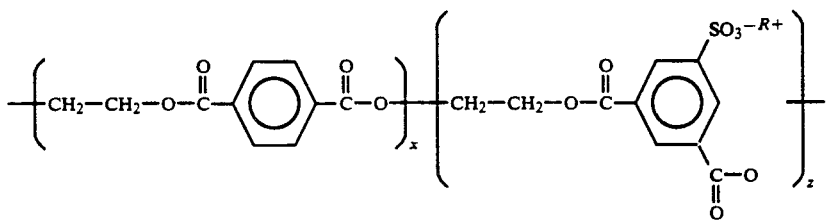

which repeating units are identical to repeating units present in the polyethylene terephthalate polyester.

The generally hydrophilic moiety should generally not be soluble in the polyester from which the polyester article is formed. As used herein, the generally hydrophilic moiety will be considered insoluble in the polyester when a homopolymer formed from repeating units of said moiety are not within the spheres of interaction for the polyester. Again, the spheres of interaction for a particular polyester can be determined as described by Knox.

For example, when the polyester is (poly)ethylene terephthalate, a generally hydrophilic moiety which is insoluble in the polyester should have solubility parameters (dispersion, polar, and H-bonding) which do not fall within either of the ranges (Range 1 or Range 2) set forth above.

For example, when the polyester article is formed from a polyethylene terephthalate polyester represented by the formula:

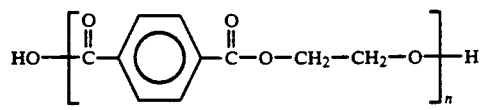

the copolymeric material may be a compound represented by the following formula:

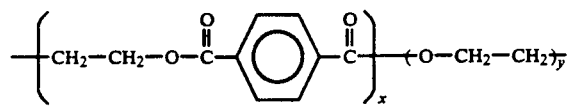

wherein X and Y are integers and R is hydrogen or other suitable cation. In the above example the repeating unit parenthetically preceding the X is the generally hydrophobic moiety which is soluble in the polyethylene terephthalate polyester and the moiety parenthetically preceding the Y is a generally hydrophilic moiety which is generally insoluble in the polyethylene terephthalate polyester. Alternatively, the copolymeric composition may be represented by the following formula:

wherein X and Z are integers. Again, the moiety parenthetically preceding the X is the generally hydrophobic moiety with the moiety generally preceding the Z representing the generally hydrophilic moiety.

Exemplary of other moieties which may form the generally hydrophilic moiety of the copolymeric materials are those hydrophilic moieties described as suitable for use as the active groups present in the crystallizable polymeric compounds described in U.S. Pat. No. 3,416,952 issued Dec. 17, 1968 to McIntyre. Exemplary of such moieties are sulfonic, cyano, nitro, ammonium, hydroxyl, carboxyl, and the like.

The exact selection of the copolymeric material to use when treating a particular polyester material is relatively easily determined through experimentation. The requirements being that the copolymeric material comprise at least one generally hydrophobic moiety which is soluble in the polyester and at least one generally hydrophilic moiety which is generally insoluble in the polyester. It is to be understood that the copolymeric materials may comprise two or more generally hydrophobic moieties and/or two or more generally hydrophilic moieties. It is preferred that the copolymeric material have a weight average molecular weight ($M_w$) of less than about 10,000. For ease of application, it is most preferred that the copolymeric material be a liquid at room temperature (~23° C.).

The copolymeric material is melt fused to the polyester. As used herein, the term "melt fused" refers to the situation wherein the copolymeric material contacts the polyester when the polyester is at a temperature above its melting point. Applicants have discovered that melt fusion of the polyester and the copolymeric material as described herein produces a polyester having a generally hydrophilic surface which is generally less fugitive than a similar surface which is not formed by melt fusion.

Without intending to be bound by any theory, it is hypothesized that melt fusion of the copolymeric materials to the polyester article causes the soluble generally hydrophobic moieties to dissolve in the polyester article and become entangled in the polymer chains of said polyester. The insoluble generally hydrophilic moieties of the copolymeric materials do not dissolve in the polyester and tend to remain on the surface of the polyester article. In this way, the generally hydrophilic moieties provide a generally hydrophilic character to the surface of the polyester.

While melt fusion of the copolymeric materials to the polyester produces a more durable hydrophilic surface than known methods, it is possible for the hydrophobic moieties of the melt fused copolymeric materials to become disentangled from the polyester and be washed away. This is more likely to occur if the generally hydrophilic moiety of the copolymeric material is strongly hydrophilic possessing a strong affinity for water. In such a case, when the polyester articles treated with said copolymeric materials are placed in an aqueous environment the attraction of the hydrophilic moiety for water can be stronger than the forces holding the generally hydrophobic moiety in the polyester thus causing the hydrophobic moieties to be released from the polyester which allows the copolymeric material to pass into the water.

One method of determining whether or not the copolymeric material is fugitive is to measure the surface tension of an aqueous phase in which a treated polyester article has been washed. If the copolymeric materials are fugitive and are pulled away from the polyester the surface tension of the aqueous phase will be lowered. In this manner it is possible to compare the relative permanence of various surface treatments.

A polyester article having copolymeric material melt fused thereto according to the present invention will be considered to be less fugitive than a similar polyester article having copolymeric materials present thereon but not melt fused thereto when the polyester article according to the present invention can undergo more repeated wash/dry cycles without lowering the surface tension of the wash water as much as the article having the non-melt fused copolymeric materials thereon. The specific test method employed in conducting the wash/dry cycles is set forth below in connection with the examples.

As a general rule it is desirable that the polyester articles according to the present invention be able to undergo at least 3 wash/dry cycles, described below in connection with the examples, without lowering the surface tension of the wash water employed in the third cycle more than 5 dynes per centimeter, preferably, at least 3 wash/dry cycles without lowering the surface tension of the wash water employed in the third cycle more than 3 dynes per centimeter.

Alternatively, it is desirable that the polyester articles according to the present invention be able to undergo at least 3 wash/dry cycles, described below in connection with the examples, without eliminating more than about 20 percent of the copolymeric material originally melt-fused to the surface of the polyester article.

Methods of forming the polyesters from which the polyester articles described herein are formed are known to those skilled in the art. Similarly, methods of forming the copolymeric compounds which form the surface treatments of the present invention are similarly well known. Moreover, a number of copolymeric compounds suitable for use in the present invention are commercially available. This will be discussed in greater detail below in connection with the examples.

As a general rule, the copolymeric materials of the present invention will comprise the generally hydrophobic moieties and the generally hydrophilic moieties in a ratio of from 5:1 to about 1:5 preferably from about 2:1 to about 1:2. In the case where the concentration of generally hydrophobic moieties is relatively low compared to the number of hydrophilic moieties it is hypothesized that the copolymeric compositions may be more fugitive due to the stronger attractive forces between the hydrophilic moieties and water due to the relatively large number of hydrophilic moieties. Conversely, when there are a relatively large number of generally hydrophobic moieties compared to the number of hydrophilic moieties the copolymerizable compounds are believed to be generally less fugitive (also, possibly, rendering the surface less hydrophilic). This, of course, is dependent on the degree of solubility between the generally hydrophobic moieties and the polyester as well as the degree of hydrophilicity of the hydrophilic moieties.

As a general rule it is desired that the hydrophilic moieties have molecular weights of from about 45 to about 3000 and preferably from about 150 to about 2000. It is generally desired that the hydrophobic moieties have molecular weights of from about 75 to about 3000 and preferably of from about 750 to about 2000. If the molecular weight of, for example, the hydrophobic moiety is less than about 75, the moiety lacks sufficient chain length to become dissolved and entangled in the polyester. In such a case the copolymeric material may be undesirable fugitive. Conversely, if the molecular weight of the hydrophilic moiety is greater than about 3000, the copolymeric material may be too strongly hydrophilic and may again be unduly fugitive.

The copolymeric compositions of the present invention may be applied to the polyester articles in an amount sufficient to impart to said polyester articles the desired degree of hydrophilicity. The amount of copolymeric composition applied to the polyester articles will depend on a variety of factors including the relative hydrophilicity of the hydrophilic moieties, the ratio of hydrophobic moieties to hydrophilic moieties in the copolymeric compositions, the relative insolubility of the hydrophilic moiety (the more insoluble the hydrophilic moiety is in polyester the more hydrophilic moieties will remain on the surface of the polyester article) and the like. Nonetheless, as a general rule, the copolymeric compositions will be applied to the polyester articles such that the concentration of hydrophilic moieties present on the surface of the polyester article is at least about 0.1 percent of the total surface area, preferably at least about 2.0 percent of the total surface area.

In a second aspect, the present invention concerns a method for providing an article made from a generally hydrophobic polyester with a generally hydrophilic surface. The method comprises the step of contacting a generally hydrophobic polyester with a copolymeric material comprising a generally hydrophobic moiety and a generally hydrophilic moiety. The generally hydrophobic polyester and the copolymeric material are as described above. The polyester is contacted with the copolymeric material when the polyester is at a temperature above its melting point. Any method in which the polyester and the copolymeric material come into contact while the polyester is at a temperature above its melting point is suitable for use in the present invention.

In one preferred embodiment of the method according to the present invention the polyester and copolymeric material are brought into contact immediately after the polyester has been extruded. For example, when it is desired to form a polyester fiber exhibiting hydrophilic characteristics, applicants have discovered that it is particularly desirable to cause the copolymeric material to contact the polyester immediately after the polyester has been extruded, for example, in the shape of a fiber.

In one embodiment, an aqueous solution of the copolymeric material can be sprayed on the polyester as it exits a die tip. Such a process has been found to produce a polyester having a particularly non-fugitive, hydrophilic surface. Specifically, as the polyester exits the die it undergoes a phenomenon known to those skilled in the art as die swell. "Die swell" refers to the situation where a material extruded under pressure from a die expands after extrusion. By contacting the polyester with the copolymeric material as the polyester is experiencing die swell it is believed that better entanglement is achieved between the polyester and the generally hydrophobic moieties of the copolymeric material. Nonetheless, it is to be understood that it is not necessary to contact the polyester with the copolymeric composition while the polyester is undergoing die swell so long as the polyester and the copolymeric composition are brought into contact while the polyester is at a temperature above its melting point.

In the situation wherein the copolymeric material is applied to the polyester as the polyester is exiting a die in the form of a fiber the copolymeric composition is suitably applied to the polyester in the form of an aqueous solution or dispersion containing from about 0.1–10 preferably from about 1.0–3.0 weight percent of the copolymeric composition based on total weight of the aqueous solution.

Polyester fibers formed according to the present invention have been found to produce hydrophilic fibers which are suitable for use in personal care products, such as diapers, adult incontinence products, feminine napkins, bandages, and the like. In such a use, the polyester fibers according to the present invention are formed into nonwoven fabrics such as melt blown fabrics spunbonded fabrics and the like. The nonwoven fabrics will generally have a density of from about 0.005 to about 0.3 gram per cubic centimeter. Such nonwoven fabrics can be employed in a diaper as a component other than the back sheet since the nonwoven fabrics will allow multiple insults of urine to pass therethrough. Diapers and similar products are generally described in U.S. Pat. No. 4,710,187 issued Dec. 1, 1987 to Boland et al.; U.S. Pat. No. 4,762,521 issued Aug. 9, 1988, to Roessler et al.; U.S. Pat. No. 4,770,656 issued Sep. 13, 1988, to Proxmire et al.; and U.S. Pat. No. 4,798,603 issued Jan. 17, 1989 to Meyer et al., which references are incorporated herein by reference.

The present invention can best be understood by reference to the following examples (including comparative examples) which examples are not intended to limit, in any way, the scope of the invention as set forth in the claims.

EXAMPLES

In all of the following examples, the following test procedures are used. All percentages are by weight unless otherwise specifically stated.

Float - Sink Test

A one inch square (2.54 cm × 2.54 cm) of the sample to be tested is placed in 60 cubic centimeters of water present in a 100 cubic centimeter beaker. The sample is allowed to sit undisturbed on the surface of the water for two hours. The behavior of the test sample is recorded as a sink or a float at the beginning and end of the two hour period of time. The sample is then removed from the water, blotted dry on a paper towel and air dried overnight. The test procedure is then repeated and the results recorded.

Wash/Dry Cycle

A test sample 8 inches wide (20.32 cm) and 15 inches long (38.1 cm) is provided. The test sample is placed in one liter of room temperature (about 23° C.) water. The sample is allowed to remain in the water for two minutes while being stirred at 15–20 revolutions per minute by a mechanical stirrer. The test sample is then removed from the wash water and excess liquid squeezed back into the wash water. The sample is allowed to air dry overnight and the process repeated the desired number of times. The surface tension of the wash water is determined after each wash/dry cycle with fresh water being used for each wash/dry cycle. The surface tension of the water is determined according to ASTM test method D 1590 -60 using a Fischer TM tensiometer.

EXAMPLE 1

Meltblown polyester webs are made in the following manner. Polyethylene terephthalate pellets (melting point 265° C.) commercially available from Hoechst-Celanese under the trade designation EXX-101 are provided. The pellets are dried in a Whitlock TM Dryer for a minimum of 2 hours at 230° F. (110° C.). The pellets are then transferred to a Johnson Plastics extruder and extruded in a melt blown process. The webs are formed at slightly different processing conditions set forth in more detail in Table 1. As the polymer exits the die tip, an aqueous solution of one of the following materials is applied thereto:

Triton TM X-102, a surfactant represented by the formula:

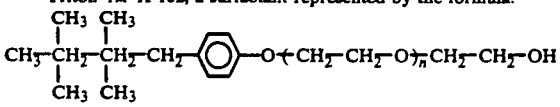

wherein n is 11 or 12 which surfactant is commercially available from the Rohm and Haas Company.

Milease TM MPA a block copolymer represented by the formula:

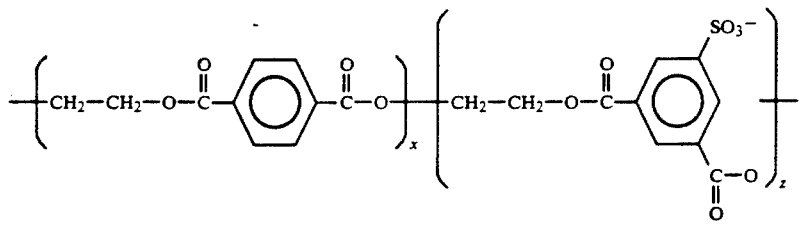

wherein X, and Z are integers which block copolymer is commercially available from ICI Americas; or Milease ™ T a block copolymer represented by the formula:

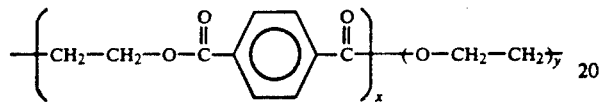

wherein X, and Y are integers, which block copolymer is commercially available from ICI Americas.

The concentration of the various additives present in the aqueous solutions is set forth in table 1. The aqueous solutions are sprayed on the polymer as it exits the die tip in a molten condition. The aqueous solutions are sprayed on the molten polymer by a spray boom which solutions are delivered to the spray boom by a Master Flex ™ pump. The spray is applied such that 1 ounce of polymer receives about 1 ounce (2.83 grams) of aqueous solution. All of the meltblown webs formed have a basis weight of 1 ounce per square yard (3.39 grams per square meter).

A control sample (Sample 1) of a 1 ounce per square yard (3.39 grams per square meter) polyester meltblown web is prepared without the application of any aqueous solution as the polymer exits the die tip. The various forming conditions are set forth in Table 1.

TABLE 1

|  | Sample No. | | | |
| --- | --- | --- | --- | --- |
|  | 1* | 2* | 3 | 4 |
| Barrel Zone 1 (°F.) | 540 | 540 | 540 | 540 |
| 2 | 580 | 580 | 580 | 580 |
| 3 | 590 | 590 | 590 | 590 |
| Transfer Zones (1-2) (°F.) | 590 | 590 | 590 | 590 |
| Valve Zone (°F.) | 580 | 580 | 580 | 580 |
| Die Zones (1-5) (°F.) | 600 | 600 | 600 | 600 |
| Die Temperature (°F.) | 589 | 589 | 589 | 589 |
| Barrel Pressure (×10) (psig) | 53 | 59 | 64 | 67 |
| Die Pressure (psig) | 117 | 205 | 229 | 255 |
| Screw Speed (ppm) | 62 | 62 | 62 | 68 |
| Extruder motor amps | 8.5 | 9.0 | 9.5 | 9.5 |
| Polymer Throughput (lbs/hour) | 1.6 | 1.6 | 1.6 | 1.6 |
| Chromalox Temperature (°F.) | 589 | 589 | 589 | 590 |
| Chromalox Air Pressure (psi) | 3 | 3 | 3 | 3 |
| Additive | None | Triton ™ | Milease ™ (HPA) | Milease ™ (T) |
| Concentration[1] | — | 2.0 | 2.0 | 2.5 |
| Spray Rate (ml/minute) | — | 480 | 520 | 500 |
| Forming Drum Vacuum (in. of water) | 6.5 | 6.5 | 6.5 | 6.5 |
| Forming Distance, Horizontal (inch) | 11 | 11 | 11 | 11 |
| Forming Distance, Vertical (inch) | 12.5 | 12.5 | 12.5 | 12.5 |

*Not an example of the present invention
[1]Concentration in weight percent based on total solution weight The samples so prepared are then subjected to the float-sink and wash/dry cycle tests described above. The results of these tests are set forth in Table 2.

TABLE 2

|  | Sample No. | | | |
| --- | --- | --- | --- | --- |
|  | 1* | 2* | 3 | 4 |
| Float-Sink Test[1] | | | | |
| Cycle 1 | F/F | S/S | — | S/S |
| Cycle 2 | F/F | F/F | — | S/S |
| Cycle 3 | F/F | F/F | — | S/S |
| Cycle 4 | F/F | F/F | — | F/F |
| Wash/Dry Cycle[2] | | | | |
| Cycle 1 | 2.4 | 31.2 | — | 15 |
| Cycle 2 | 3.2 | 13.2 | — | 2.9 |
| Cycle 3 | 0.7 | 7.9 | — | 2.6 |
| Cycle 4 | — | — | — | 0.3 |
| Cycle 5 | — | — | — | 0 |
| Cycle 6 | — | — | — | 0.1 |

*Not an example of the present invention.
[1]Reported as floating (F) or having sunk (S) initially and at the end of two hours (initial/end).
[2]Reported as change in surface tension in dynes per centimeter.

COMPARATIVE EXAMPLE

Meltblown samples prepared the same as the control sample of Example 1 are provided. The samples are post formation-treated by immersing the samples in an aqueous solution containing 2.5 weight percent Milease ™ T based on the total weight of the aqueous solution. The samples are then placed in an oven at various temperatures for various periods of time. The exact time and temperature are set forth in Table 3. The samples are then subjected to the float - sink, and wash/dry cycle tests described above. The results of this testing are set forth in Table 3.

TABLE 3

| | Float-Sink Test[1] | | | | | |
|---|---|---|---|---|---|---|
| Additive | Temperature (°C.) | Time (sec) | Cycle 1 | Cycle 2 | Cycle 3 | Cycle 4 |
| Milease TM T | 90° | 1 | S/S | F/F | F/S | F/F |
| Milease TM T | 90° | 5 | S/S | S/S | S/S | F/F |
| Milease TM T | 90° | 10 | S/S | F/F | S/S | S/S |
| Milease TM T | 90° | 30 | S/S | F/F | F/S | F/F |
| Milease TM T | 90° | 60 | S/S | S/S | F/F | F/F |
| Milease TM T | 90° | 300 | S/S | F/F | F/S | F/F |
| Milease TM T | 125° | 1 | S/S | F/S | F/S | S/S |
| Milease TM T | 125° | 5 | S/S | F/F | F/S | F/F |
| Milease TM T | 125° | 10 | S/S | S/S | S/S | F/F |
| Milease TM T | 125° | 30 | S/S | F/S | S/S | F/F |
| Milease TM T | 125° | 60 | S/S | F/F | F/F | S/S |
| Milease TM T | 125° | 300 | S/S | F/S | F/S | F/F |
| Milease TM T | 140° | 1 | S/S | F/F | F/S | F/S |
| Milease TM T | 140° | 5 | S/S | F/S | F/S | F/F |
| Milease TM T | 140° | 10 | S/S | F/F | S/S | F/F |
| Milease TM T | 140° | 30 | S/S | F/F | S/S | F/F |
| Milease TM T | 140° | 60 | S/S | F/S | S/S | F/F |
| Milease TM T | 140° | 300 | S/S | F/F | S/S | F/F |

| | Wash/Dry Cycle Test[2] | | | | |
|---|---|---|---|---|---|
| Additive | Temperature (°C.) | Time (sec) | Cycle 1 | Cycle 2 | Cycle 3 |
| Milease TM T | 90° | 1 | 19.6 | 14.7 | 9.0 |
| Milease TM T | 90° | 300 | 15.7 | 14.2 | 6.9 |
| Milease TM T | 140° | 1 | 15 | 14.2 | 7.8 |
| Milease TM T | 140° | 300 | 15.6 | 13.0 | 8.7 |
| Milease TM T | 140° | 1800 | 17.9 | 12.6 | 7.6 |

[1]Reported as floating (F) or having sunk (S) initially and at the end of two hours (initial/end).
[2]Reported as change in surface tension in dynes per centimeter.

The meltblown samples can not withstand temperatures significantly greater than those used above without losing their dimensional stability. In order to evaluate post formation-treatment at higher temperatures, a bonded carded web of polyethylene terephthalate staple fibers is provided. The web is stripped of its finish by being immersed in 300 milliliters of hexane, dried, immersed in 300 milliliters of methanol, dried, and the process repeated with fresh hexane and methanol being used. An aqueous solution containing 0.5 weight percent Milease TM T based on total aqueous solution weight is sprayed on the web. Enough of the aqueous solution is applied to wet essentially the entire surface area of the web. The sample is then placed in a Blue M TM oven (Model no. OV 490A3) at 240° C. for varying periods of time. The samples are then subjected to the wash/dry cycle test described above to evaluate the durability of the coating. The results of the testing and the drying periods are set forth in Table 4.

TABLE 4

| | Wash/Dry Cycle Test[1] | | | | |
|---|---|---|---|---|---|
| Additive | Temperature (°C.) | Time (sec) | Cycle 1 | Cycle 2 | Cycle 3 |
| Milease TM T | 240° | 1 | 17.5 | 12.6 | 15.2 |
| Milease TM T | 240° | 30 | 12.8 | 7.6 | 11.4 |
| Milease TM T | 240° | 300 | 6.9 | 6.7 | 9.5 |

[1]Reported as change in surface tension in dynes per centimeter.

As can be seen from reference to Table 2, meltblown polyester webs which are not treated with any of the described materials generally float in the float-sink test. This indicates that those webs are generally hydrophobic since water is unable to penetrate the surface of the web. If the webs were hydrophilic and water could penetrate their surface the webs would sink since polyester is more dense than water.

The web treated with Triton TM sinks in the first exposure but floats on subsequent exposures. This indicates that while the web is initially hydrophilic (due to the Triton TM treatment) the Triton TM is fugitive and washes off of the fibers. Accordingly, subsequent exposures indicate a hydrophobic character. The webs treated with Milease TM are seen to sink through three exposures and float on the fourth. This indicates that the Milease TM treatment renders the webs hydrophilic in character and that the treatment is less fugitive than the Triton TM treatment.

Reference to Table 3 indicates that the post formation-treatment of the webs with Milease TM T at different temperatures and for different times, does generally not provide a reproducible hydrophilic web.

Reference to Tables 2, 3 and 4 indicate that the webs which have the Milease TM T melt fused thereto according to the present invention appear to have a less fugitive treatment thereon. While the webs according to the present invention do experience a drop in surface tension after one wash cycle, subsequent wash cycles indicate less than a 5 dyne per centimeter change after the third cycle. The webs which are post formation-treated experience a drop in surface tension greater than 5 dynes per cubic centimeter after the third cycle. It is hypothesized that the initial drop in surface tension experienced by the webs according to the present invention is due to the fact that the copolymeric composition employed (Milease TM T) contains a surfactant (as a wetting agent) which is generally completely removed in the initial wash cycle.

From the above, it can be seen that melt fusing the copolymeric materials on to the polyester substrate significantly improves the durability of the hydrophilic character imparted to the polyester.

Those skilled in the art will recognize that the present invention is capable of many modifications and variations without departing from the scope thereof. Accordingly, the detailed descriptions and examples set forth above are meant to be illustrative only and are not meant to limit in any manner, the scope of the invention as set forth in the following claims.

What is claimed is:

1. A method for providing an article made from a generally hydrophobic polyester with a generally hydrophilic surface, the steps of the method comprising:
   contacting said generally hydrophobic polyester with a copolymeric material while said hydrophobic polyester is at a temperature above its melting point whereby the copolymeric material is melt fused to said hydrophobic polyester, said copolymeric material comprising a generally hydrophobic moiety soluble in said polyester and a generally hydrophilic moiety generally insoluble in said polyester.

2. The method according to claim 1 wherein upon contact, said generally hydrophobic moiety is dissolved within said polyester and said generally hydrophilic moiety remains generally at the surface of said polyester.

3. The method according to claim 2 wherein said polyester is substantially molten during said contacting steps.

4. The method according to claim 1 further comprising the step of extruding said generally hydrophobic polyester prior to contacting said polyester with said copolymeric material.

5. The method according to claim 4 wherein said generally hydrophobic polyester is extruded immediately prior to contacting said polyester with said copolymeric material such that the polyester is undergoing die swell during said contacting step.

6. The method according to claim 1 wherein said copolymeric composition is in the form of an aqueous solution during the contacting step.

7. The method according to claim 6 wherein the polyester is undergoing die swell at the point said copolymeric composition contacts said polyester.

8. A method for providing a nonwoven fabric made from a generally hydrophobic polyester with a generally hydrophilic surface, the steps of the method comprising:

melting said generally hydrophobic polyester to form a molten polyester;

extruding fibers of said molten polyester under a pressure sufficient to cause the molten polyester fibers to undergo die swell immediately after extrusion; and applying a copolymeric material to said molten polyester fibers immediately after extrusion such that the molten polyester fibers are undergoing die swell at the time of application of said copolymeric material, said copolymeric material comprising a generally hydrophobic moiety soluble in said molten polyester and a generally hydrophilic moiety insoluble in said molten polyester.

9. The method according to claim 8 further comprising the step of quenching the molten polyester fibers after application of said copolymeric material thereto.

* * * * *